United States Patent
Kim et al.

(10) Patent No.: US 9,535,283 B2
(45) Date of Patent: Jan. 3, 2017

(54) DISPLAY DEVICE AND METHOD OF MANUFACTURING THE SAME

(71) Applicant: Electronics and Telecommunications Research Institute, Daejeon (KR)

(72) Inventors: Yong Hae Kim, Daejeon (KR); Gi Heon Kim, Daejeon (KR); Hojun Ryu, Seoul (KR); Chi-Sun Hwang, Daejeon (KR); Jong-Heon Yang, Daejeon (KR); Sang Chul Lim, Daejeon (KR); Jae Bon Koo, Daejeon (KR); Jonghee Lee, Daejeon (KR); Jeong Ik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 400 days.

(21) Appl. No.: 14/286,190

(22) Filed: May 23, 2014

(65) Prior Publication Data

US 2015/0160511 A1 Jun. 11, 2015

(30) Foreign Application Priority Data

Dec. 9, 2013 (KR) .................. 10-2013-0152419

(51) Int. Cl.
G02F 1/1335 (2006.01)
(52) U.S. Cl.
CPC ... G02F 1/133553 (2013.01); G02F 1/133555 (2013.01); *G02F 2001/133541* (2013.01); *G02F 2201/44* (2013.01)
(58) Field of Classification Search
CPC .................. G02F 1/133553; G02F 1/133528

USPC .......................................................... 349/114
See application file for complete search history.

(56) References Cited

U.S. PATENT DOCUMENTS

| 6,424,326 B2 * | 7/2002 | Yamazaki .............. 257/E27.111 |
| 7,599,025 B2 | 10/2009 | Yeh et al. |
| 2003/0142244 A1 * | 7/2003 | Kato ................. G02F 1/133553 349/61 |
| 2012/0320287 A1 | 12/2012 | Kim et al. |

FOREIGN PATENT DOCUMENTS

| JP | H10-78582 A | 3/1998 |
| KR | 2012-0139076 A | 12/2012 |

OTHER PUBLICATIONS

Munisamy Anandan "Novel LCD structures with OLED backlight integration for mobile display applications", 7th International Meeting on Information Display, vol. 37, No. 4, pp. 1093-1095, Aug. 27, 2007.

(Continued)

*Primary Examiner* — Lucy Chien
(74) *Attorney, Agent, or Firm* — Rabin & Berdo, P.C.

(57) ABSTRACT

Provided is a display device and a method of manufacturing the same. The display device includes a reflective display part including a first cathode electrode and a first anode electrode and a liquid crystal layer, a light emitting display part including a second cathode electrode and a second anode electrode and a light emission film, and a thin film transistor part being electrically connected to the first and second anode electrodes. The light emitting display part further includes a bank disposed on one side of the second anode electrode between the second anode electrode and the light emission film.

18 Claims, 14 Drawing Sheets

(56) References Cited

OTHER PUBLICATIONS

Uiyeong Cha, et al., "Transflective Liquid Crystal Display using Cholesteric Liquid Crystal Film", IMID/IDMC/ASIA Display 2010 Digest, vol. 2, No. 7, pp. 711-712, Oct. 2010.

* cited by examiner

DISPLAY DEVICE AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2013-0152419, Dec. 9, 2013, the entire contents of which are hereby incorporated by reference.

BACKGROUND OF THE INVENTION

The present invention disclosed herein relates to a display device and a method of manufacturing the same, and more particularly, to a display device including a light emitting display part and a reflective display part and a method of manufacturing the same.

Among displays being released at present, light emitting type displays have superior image quality in the dark environment, but the image quality thereof under the strong sunlight is deteriorated. Also, the light emitting type displays consume a lot of energy. On the other hand, reflective displays have no energy consumption and are improved in image quality rather in the external strong sunlight. However, the reflective displays are deteriorated in the image quality in the display region dark environment. Therefore, if the light emitting type displays and the reflective displays are properly operated according to the external environments, the image quality may be improved, and also the energy consumption may be reduced.

SUMMARY OF THE INVENTION

The present invention provides a display device having low power consumption.

The present invention also provides a method of manufacturing the display device.

The object of the present invention is not limited to the aforesaid, but other objects not described herein will be clearly understood by those skilled in the art from descriptions below.

Embodiments of the present invention provide display devices including: a reflective display part including a first cathode electrode and a first anode electrode that face each other and a liquid crystal layer that is filled between the first cathode electrode and the first anode electrode; a light emitting display part spaced apart from the reflective display part, the light emitting display part including a second cathode electrode and a second anode electrode that face each other and a light emission film between the second cathode electrode and the second anode electrode; and a thin film transistor part between the reflective display part and the light emission display part, the thin film transistor being electrically connected to the first and second anode electrodes, wherein the light emitting display part further includes a bank disposed on one side of the second anode electrode between the second anode electrode and the light emission film.

In some embodiments, the light emission film may include a first upper portion that is in contact with the bank, a second upper portion below the first upper portion to contact the second anode electrode, and a side portion connecting the first and second upper portions to each other.

In other embodiments, the reflective display part may further include a first substrate below the first anode electrode, and the first substrate may include a display region substrate corresponding to a display region and a non-display region substrate corresponding to the non-display region.

In still other embodiments, the display devices may further include a driving part electrically connected to the light emitting display part and disposed on a position corresponding to the non-display region.

In even other embodiments, the display devices may further include a circular polarization plate adjacent to the non-display region.

In yet other embodiments, the display devices may further include a second substrate spaced apart from the second cathode electrode to face the second cathode electrode, wherein the second substrate may be coupled to the bank by using an adhesion part.\

In further embodiments, the adhesion part may have a thickness of about 10 μm or less.

In still further embodiments, the first cathode electrode and the first and second anode electrodes may be transparent electrodes, and the second cathode electrode may be a reflective electrode.

In even further embodiments, the liquid crystal layer may include a cholesteric liquid crystal, the first and second cathode electrodes and the first and second anode electrodes are transparent electrodes, and the display device may further include a light absorption layer disposed adjacent to the second substrate to absorb light.

In other embodiments of the present invention, methods for manufacturing a display device, the methods include: forming a reflective display part including a first substrate, a first anode electrode, a first cathode electrode, and a liquid crystal layer, which is filled between the first anode electrode and the first cathode electrode on the first substrate; forming a light emitting display part spaced apart from the reflective display part, the light emitting display part including a second anode electrode, a light emission film, a bank, and a second cathode electrode; and forming a thin film transistor part between the reflective display part and the light emitting display part to be electrically connected to the first and second anode electrodes, wherein the forming of the light emitting display part includes: forming a bank on one side of the second anode electrode; conformally forming the light emission film on the bank and the second anode electrode; conformally forming the second cathode electrode on the light emission film.

In some embodiments, the forming of the reflective display part may further includes: forming the first anode electrode on an initial substrate; etching the initial substrate to form a non-display region to define a display region and the non-display region; and forming the liquid crystal layer, the first cathode electrode, and a display region substrate on the first anode electrode exposed to display region.

In other embodiments, the process forming of the reflective display part may further includes: forming a first polyimide layer between the initial substrate and the first anode electrode; and forming a second polyimide layer between the liquid crystal layer and the first cathode electrode.

In still other embodiments, the process forming of the reflective display part may further include forming a chrome layer between the initial substrate and the first polyimide layer, wherein the chrome layer serves as an etch stop layer while the initial substrate is etched.

In even other embodiments, the methods may further include forming a driving part electrically connected to a portion of the second anode electrode, which corresponds to the non-display region.

In yet other embodiments, the methods may further include forming a circular polarization plate that is adjacent to the display region substrate.

In further embodiments, the methods may further include: forming a passivation layer having a first contact hole, through which a portion of the anode electrode is exposed, on the first anode electrode; forming a first contact plug formed by filling a conductive material into the first contact hole; forming a thin film transistor electrically connected to the first contact plug on the passivation layer; forming an insulation film having a second contact hole, through which a portion of the thin film transistor is exposed, on the thin film transistor; and forming a second contact plug formed by filling the conductive material into the second contact hole, wherein the second contact plug electrically connects the thin film transistor to the second anode electrode.

In still further embodiments, the methods may include adhering a second substrate that is spaced apart from the second cathode electrode to the second cathode electrode by using the bank and the adhesion part, wherein the adhesion part may have a thickness of about 10 μm or less.

In even further embodiments, when the liquid crystal layer may be formed by using a cholesteric liquid crystal, the second cathode electrode may be a transparent electrode, and the method may further include forming a light absorption layer disposed adjacent to the second substrate to absorb light.

DETAILED DESCRIPTION OF PREFERRED EMBODIMENTS

Figure 1A:
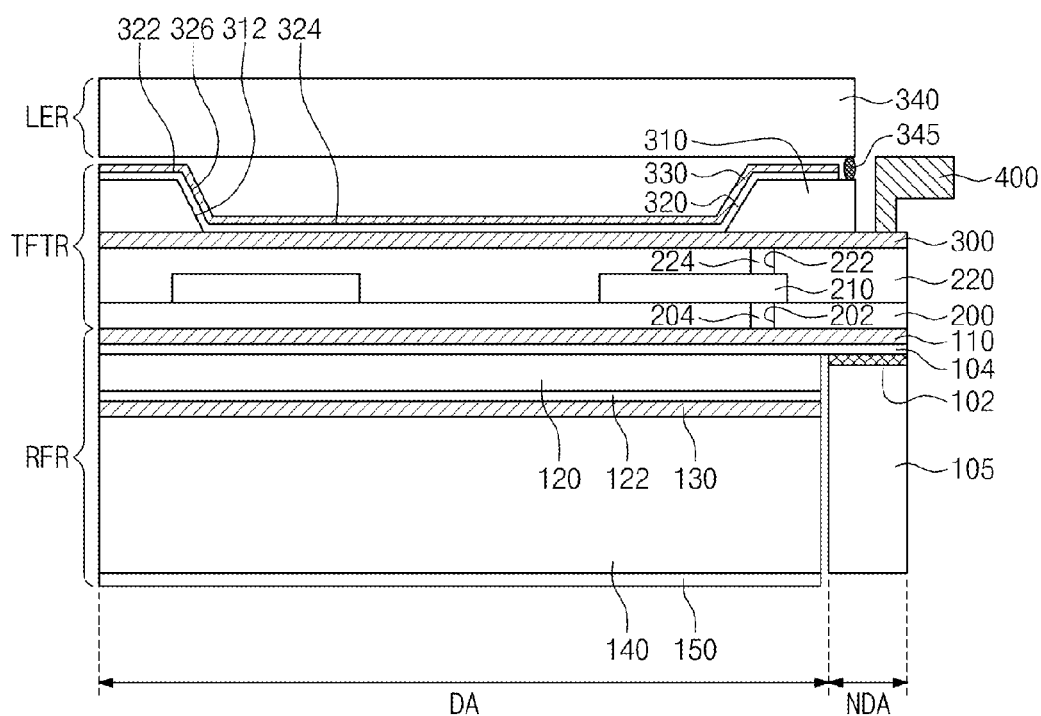
FIG. 1A is a cross-sectional view of a display device according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the embodiment, it will be understood that when an element is referred to as being 'on' another element, it can be directly on the other element, or intervening elements may also be present. In the figures, the dimensions of elements are exaggerated for clarity of illustration.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etching area illustrated in a right-angled shape may be a shape having a rounded portion or a predetermined curvature. Areas exemplified in the drawings have general properties, and are used to illustrate a specific shape of a semiconductor package region. Thus, this should not be construed as limited to the scope of the present invention. Also, though terms like a first, a second, and the like are used to describe various components in various embodiments of the present invention, those are not limited to these terms. These terms are used only to discriminate one component from another component. An embodiment described and exemplified herein includes a complementary embodiment thereof.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other elements and/or components.

Hereinafter, exemplary embodiments of the present invention will be described below in more detail with reference to the accompanying drawings.

FIG. 1A is a cross-sectional view of a display device according to an embodiment of the present invention.

Referring to FIG. 1A, the display device may include a reflective display part RFR, a light emitting display part LER, a thin film transistor part TFTR disposed between the reflective display part RFR and the light emitting display part LER. Also, the display device may include a display region DA and a non-display region NDA.

The reflective display part RFR may include a first substrate, a first cathode electrode 130, a liquid crystal layer 120, and a first anode electrode 110.

The first substrate may include a display region substrate 140 and a non-display region substrate 105. The display region substrate 140 may be a transparent plastic substrate. The non-display region substrate 105 may be a glass substrate and be transparent or opaque. According to an aspect, side surfaces of the display region substrate 140, the first cathode electrode 130, and the liquid crystal layer 120 may be covered with a side surface of the non-display region substrate 105.

The first cathode electrode 130 may be disposed on the display region substrate 140. According to an aspect, the first cathode electrode 130 may be a transparent electrode and include indium tin oxide (ITO), indium zinc oxide (IZO), zinc oxide (ZnO) or indium oxide ($In_2O_3$).

The liquid crystal layer 120 may be disposed above the first cathode electrode 130. According to an aspect, a first polyimide layer 122 may be further disposed between the first cathode electrode 130 and the liquid layer 120. For example, the first polyimide layer 122 may have a thickness of about 120 nm. The first polyimide layer 122 may help orientation of liquid crystals in the liquid crystal layer 120.

The liquid crystal layer 120 may include the liquid crystals that are generally used in a liquid crystal display. To improve reflective characteristics of the liquid crystal layer 120, a circular polarization plate 150 may be further disposed on the display region substrate 140.

The first anode electrode 110 may be disposed above the liquid crystal layer 120. According to an aspect, a second polyimide layer 104 may be further disposed between the liquid crystal layer 120 and the first anode electrode 110. The second polyimide layer 104 may help orientation of the liquid crystals in the liquid crystal layer 120. For example, the second polyimide layer 104 may have a thickness of about 120 nm. The first anode electrode 110 may be a transparent electrode and include stannic oxide ($SnO_2$) or indium oxide ($In_2O_3$). According to an aspect, the second polyimide layer 104 and the first anode electrode 110 may extend to the display region DA and the non-display region NDA.

According to an aspect, a chrome layer (Cr layer) 102 may be further disposed between the non-display region substrate 105 and the second polyimide layer 104. According to another aspect, if the second polyimide layer 104 is resistant to hydrofluoric acid (HF), the chrome layer 102 may be omitted. This will be described below in detail. According to another aspect, instead of the chrome layer, a multi-layers structure including a molybdenum layer/an amorphous silicon layer/a molybdenum layer may be further disposed between the non-display region substrate 105 and the second polyimide layer 104. The multi-layers structure may have a thickness of about 600 nm. For example, the molybdenum layer, the amorphous silicon layer and the molybdenum layer each may have a thickness of about 200 nm.

The light emitting display part LER may be spaced a predetermined distance from the reflective display part RFR to face the reflective display part RFR.

The light emitting display part LER may include a second anode electrode 300, a light emission film 320, a bank 310, a second cathode electrode 330, and a second substrate 340.

The second anode electrode 300 may be a transparent electrode and include indium tin oxide (ITO), indium zinc oxide (IZO), zinc oxide (ZnO) or indium oxide ($In_2O_3$). According to an aspect, the second anode electrode 300 may be disposed to face the first anode electrode 110.

The bank 310 may be disposed on the second anode electrode 300. According to an embodiment, the bank 310 may be disposed adjacent to the non-display region NDA. According to an aspect, the bank 310 may have an inclined side surface 312. The inclined side surface 312 may face the display region DA.

When electric fields are generated between the second anode electrode 300 and the second cathode electrode 330, the electric field may be more strongly applied to an edge of the light emission film 320. Thus, to prevent this phenomenon, the bank 310 may be disposed adjacent to the non-display region NDA.

The light emission film 320 may be conformally disposed on the second anode electrode 300 and the bank 310. The light emission film 320 may include an organic light emitting diode (OLED). Since the bank 310 is disposed on one side of the second anode electrode 300, the light emission film 320 may include a first upper portion 322 that is in contact with the bank 310 and a second upper portion 324 that is in contact with the second anode electrode 300 and disposed below the first upper portion 322. Also, the light emission film 320 may include a side portion 326 connecting the first and second upper portions 322 and 324 to each other.

The second cathode electrode 330 may be conformally disposed on the light emission film 320. According to the embodiment of the present invention, the second cathode electrode 330 may include a metal having a reflective characteristic. For example, the second electrode 330 may be completed by forming a reflective film by using Ag, Mg, Al, Pt, Pd, Au, Ni, Nd, Ir, Cr, Li, Ca, LiF/Ca, LiF/Al, and a compound thereof and the like, and then by forming ITO, IZO, ZnO, or $In_2O_3$ on the reflective film.

The second substrate 340 may be spaced a predetermined distance from the second cathode electrode 330 to face the second cathode electrode 330. For example, the second substrate 340 may include a flat glass substrate having flat top and bottom portions. The second substrate 340 may be disposed above the second cathode electrode 330. Here, the second cathode electrode 330 may not contact the second substrate 340.

The second substrate 340 may be connected to the bank 310 by using an adhesion part 340 disposed on the bank 310. The adhesion part 345 may have a thickness of about 10 μm or less. As described above, the second substrate 340 may not contact the second cathode electrode 330 by the adhesion part 345.

According to another aspect, a can type glass encapsulation (not shown) may be used instead of the second substrate 340. In this case, a filler filled in the cay type glass encapsulation is important in uniformity.

The thin film transistor part TFTR may be disposed between the emitting display part LFR and the reflective display part RFR. The thin film transistor part TFTR may include a passivation layer 200, an insulation film 220, and a thin film transistor 210.

The passivation layer 200 may be disposed on the first anode electrode 110. The passivation layer 200 may include $SiO_2$ and/or $SiN_x$. According to an embodiment, the passivation layer 200 may include a first contact hole 202. The thin film transistor 210 may be electrically connected to the first anode electrode 110 through a first contact plug 204 that fills the first contact hole 202.

The thin film transistor 210 may be disposed on the passivation layer 200. The thin film transistor 210 may include, for example, a semiconductor active layer (not shown), a source electrode (not shown), a drain electrode (not shown), and a gate electrode (not shown), which are well-known to the ordinary skilled in the art, and thus their detailed descriptions will be omitted.

The insulation film 220 may be disposed to cover the thin film transistor 210. The insulation film 220 may contact the second anode electrode 300. According to an embodiment, the insulation film 220 may include a second contact hole 222. The thin film transistor 210 may be electrically connected to the second anode electrode 300 through a second contact plug 224 that fills the second contact hole 222.

The display device may further include a driving part 400 that is electrically connected to the light emitting display part LER or the reflective display part RFR. In the current embodiment, the driving part 400 may be electrically connected to one side of the second anode electrode 300. According to an aspect, a position where the driving part 400 is disposed may be a non-display region which corresponds to the non-display region substrate 105. While the driving part 400 adheres to the one side of the second anode electrode 300, the non-display region substrate 105 disposed under the driving part 400 may endure a pressure generated during the adhesion process. According to an embodiment, the driving part 400 may include a flexible printed circuit (FPC).

Figure 1B:
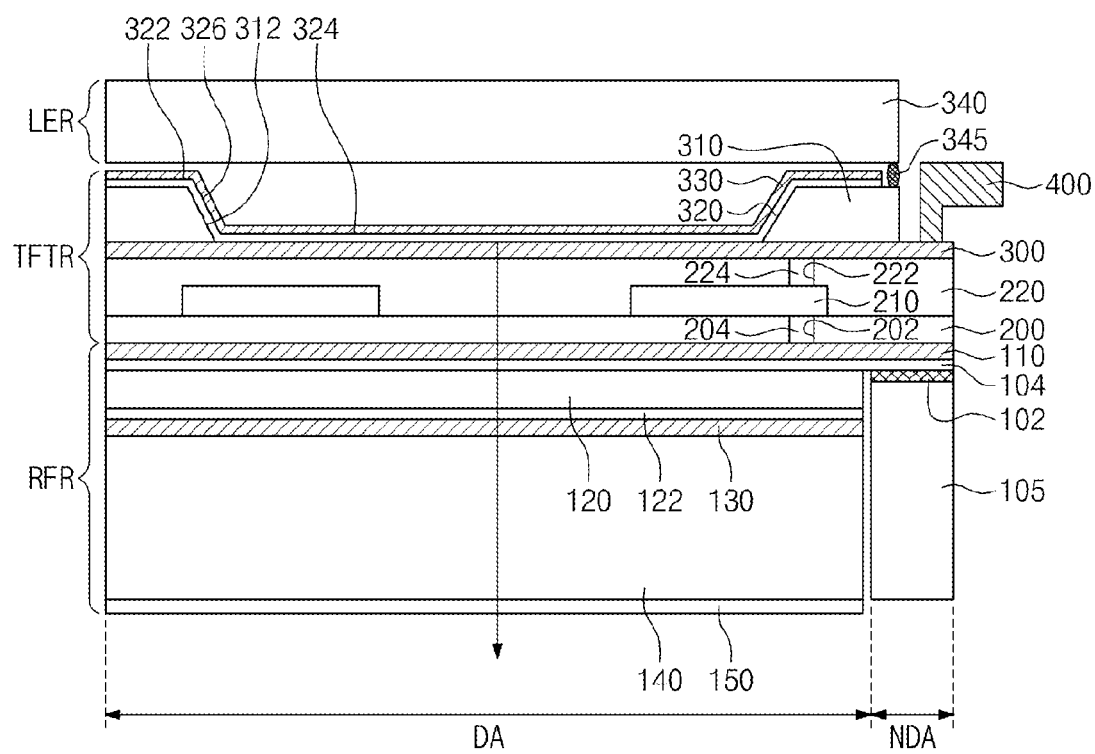
FIG. 1B is a cross-sectional view illustrating an operation of the display device of FIG. 1A when an external environment is display region dark.

FIG. 1B is a cross-sectional view illustrating an operation of the display device of FIG. 1A when an external environment is display region dark.

Referring to FIG. 1B, when an external environment is dark, the light emitting display part LER is turned on, and the reflective display part RFR is turned off. Here, light having a target color may be emitted from the light emission film 320 of the light emitting display part LER to transmit reflective display part RFR that is turned off, thereby displaying a desired image on the display region DA.

Figure 1C:
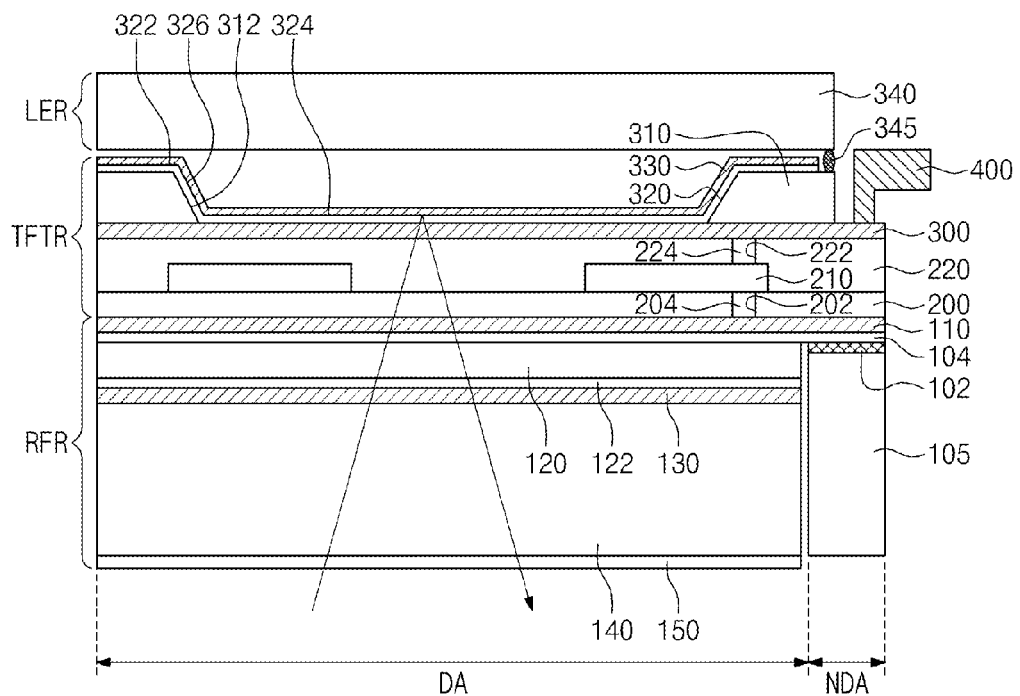
FIG. 1C is a cross-sectional view illustrating an operation of the display device of FIG. 1A when an external environment is bright.

FIG. 1C is a cross-sectional view illustrating an operation of the display device of FIG. 1A when an external environment is bright. Referring to FIG. 1C, when an external environment is bright, the light emitting display part LER is turned off, and the reflective display part RFR is turned on. Light may be irradiated from the outside. The second cathode electrode 330 including a reflective metal may play a role as the reflective plate. Thus, the reflected light may pass through the liquid crystal layer 120 that is turned on to form the desired image.

Figure 2A:
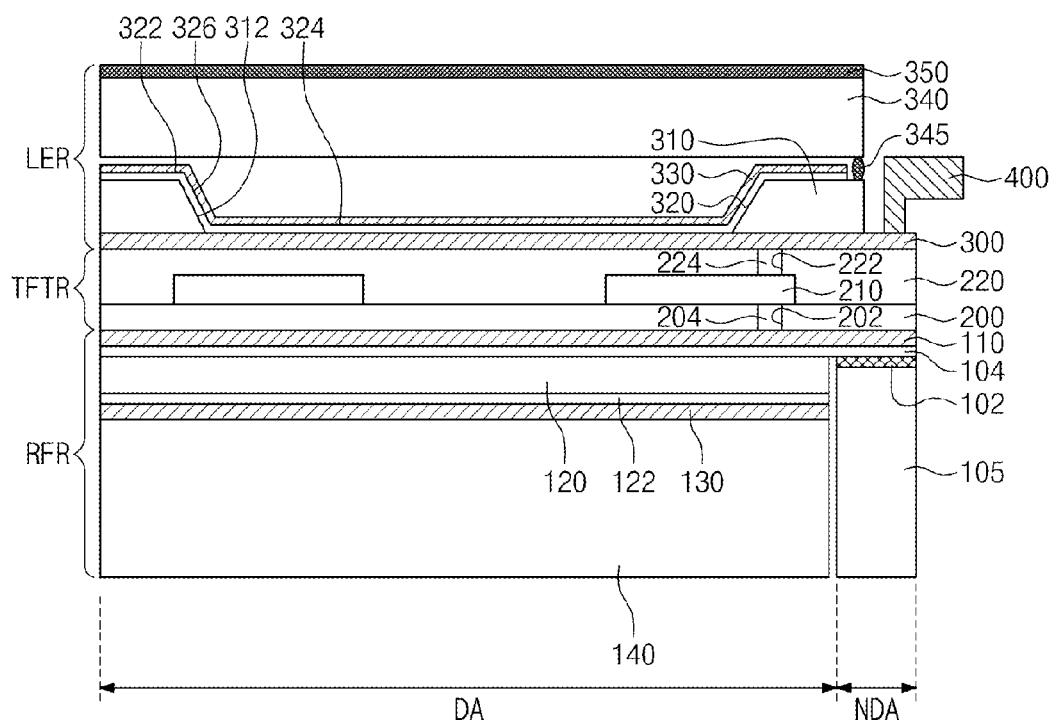
FIG. 2A is a cross-sectional view of a display device according to an embodiment of the present invention.

FIG. 2A is a cross-sectional view of a display device according to an embodiment of the present invention.

Referring to FIG. 2A, the display device may include a reflective display part RFR, a light emitting display part LER, and a thin film transistor part TFTR disposed between the reflective display part RFR and the light emitting display part LER.

The reflective display part RFR may include a first substrate, a first cathode electrode 130, a liquid crystal layer 120, and a first anode electrode 110. The light emitting display part LER may include a second anode electrode 300, a light emission film 320, a bank 310, a second cathode electrode 330, and a second substrate 340. The thin film transistor part TFTR may include a passivation layer 200, an insulation film 220, and a thin film transistor 210.

The second cathode electrode 330 according to the embodiment of FIG. 2A may be a transparent electrode and include ITO, IZO, ZnO or $In_2O_3$. In this case, a light absorption part 350 for absorbing light transmitted through the second cathode electrode 330 may be further provided on the second substrate 340.

In the embodiment of FIG. 2A, the circular polarization plate 150 may not be used, unlike in that of FIG. 1A. In this case, the liquid crystal layer 120 may include a cholesteric liquid crystal. The cholesteric liquid crystal may have a reflective characteristic in liquid crystals. Thus, the second cathode electrode 330 may not be necessary to serve as a reflective electrode.

Other components of an embodiment of FIG. 2A are substantially the same as those of an embodiment of FIG. 1A, and thus their detailed descriptions will be omitted herein. Therefore, non-explained reference numerals will be denoted by FIG. 1A.

Figure 2B:
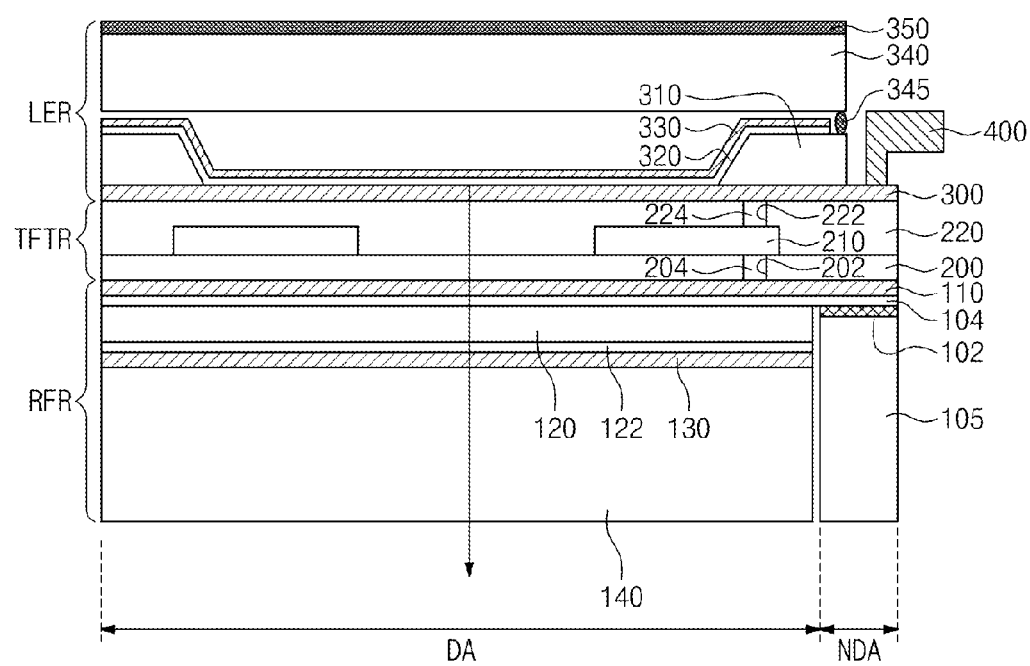
FIG. 2B is a cross-sectional view illustrating an operation of the display device of FIG. 2A when an external environment is display region dark.

FIG. 2B is a cross-sectional view illustrating an operation of the display device of FIG. 2A when an external environment is display region dark. Referring to FIG. 2B, when an external environment is dark, the light emitting display part LER is turned on, and the reflective display part RFR is turned off. Here, light having a target color may be emitted from the light emission film 320 of the light emitting display part LER to transmit reflective display part RFR that is turned off, thereby displaying a desired image on the display region DAA.

Figure 2C:
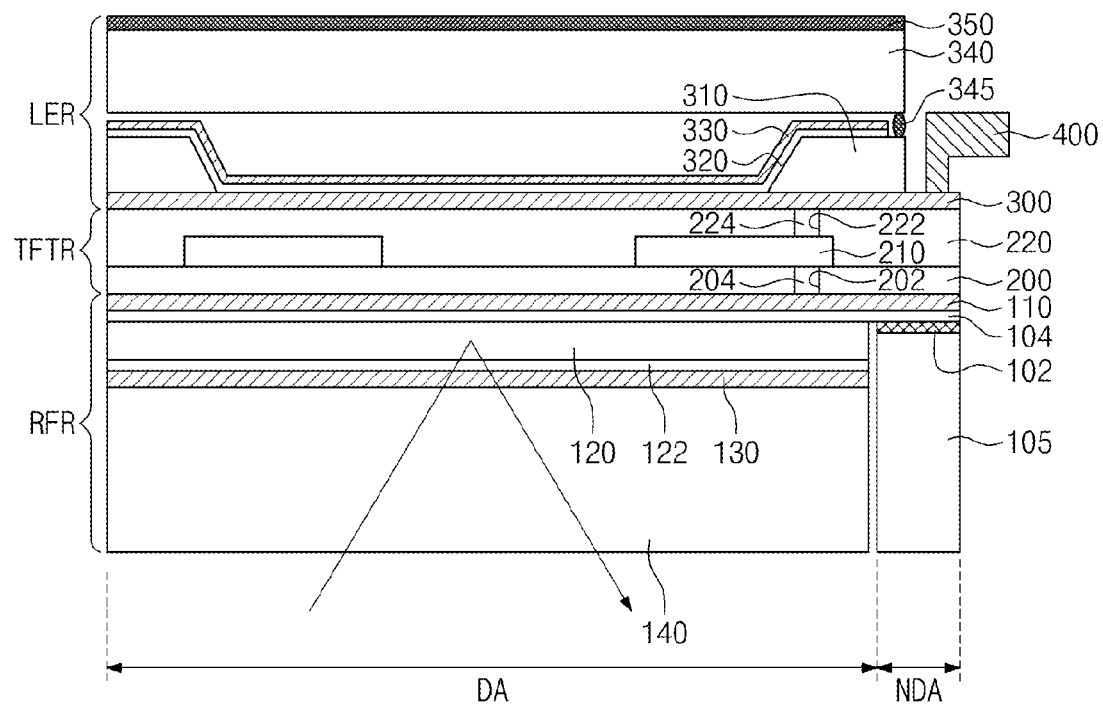
FIG. 2C is a cross-sectional view illustrating an operation of the display device of FIG. 2A when an external environment is bright.

FIG. 2C is a cross-sectional view illustrating an operation of the display device of FIG. 2A when an external environment is bright. Referring to FIG. 2C, when an external environment is bright, the light emitting display part LER is turned off, and the reflective display part RFR is turned on. The light may be irradiated from the outside. The irradiated light may be reflected by the cholesteric liquid crystal in the liquid crystal layer 120 to form a desired image.

FIGS. 3A through 3J are cross-sectional views illustrating a method of manufacturing the display devices according to an embodiment of the present invention.

Hereinafter, for convenience of description, terms of "a first" and "a second" used in the display device will be used. Thus, the terms of "the first" and "the second" may be change in order.

Figure 3A:
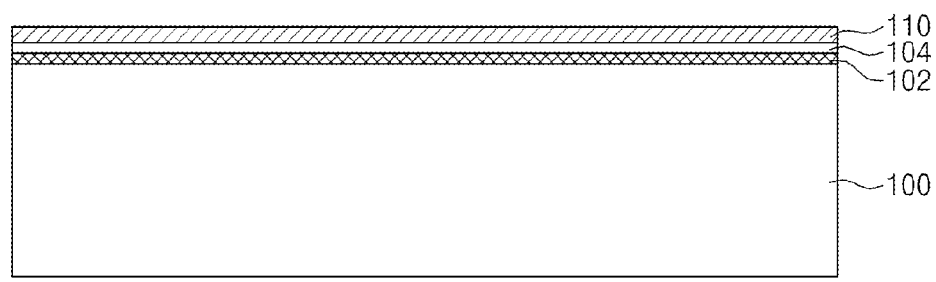
FIGS. 3A through 3J are cross-sectional views illustrating a method of manufacturing the display devices according to an embodiment of the present invention.

Referring to FIG. 3A, a chrome layer 102, a second polyimide layer 104, and a first anode electrode 110 may be successively formed on an initial substrate 100.

The initial substrate 100 may be a glass substrate. For example, the initial substrate 100 may have a thickness of about 500 µm. In the current embodiment, the chrome layer 102 may be used as an etch stop layer when the initial substrate 100 is etched in a following process. For example, the chrome layer 102 may have a thickness of about 100 nm. In another embodiment, the chrome layer 102 may be omitted, and this description will be described below in detail. According to another aspect, instead of the chrome layer, a multi-layers structure including a molybdenum layer/an amorphous silicon layer/a molybdenum layer may be further disposed between the non-display region substrate 105 and the second polyimide layer 104. The multi-layers structure may have a thickness of about 600 nm. For example, the molybdenum layer, the amorphous silicon layer and the molybdenum layer each may have a thickness of about 200 nm.

For example, the second polyimide layer 104 may be deposited with a thickness of about 120 nm.

The first anode electrode 110 may be formed on the second polyimide layer 104. The first anode electrode 110 may be a transparent electrode and include ITO, IZO, ZnO, or $In_2O_3$.

Figure 3B:
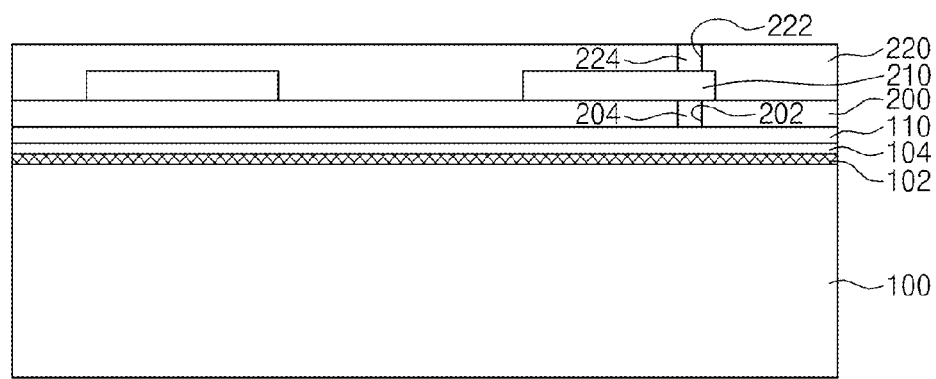

Referring to FIG. 3B, a passivation layer 200, a thin film transistor 210, and an insulation film 220 may be successively formed on the first anode electrode 110.

In more detail, the passivation layer 200 may include $SiO_2$ and/or $SiN_x$. The passivation layer 200 may be etched to form a first contact hole 202. The first contact hole 202 may expose a portion of the first anode electrode 110. The first contact hole 202 may be filled with a conductive material to form a first contact plug 204.

The thin film transistor 210 may be formed on the passivation layer 200. The first contact plug 204 may be electrically connected to the thin film transistor 210.

The insulation film 220 may be formed on the thin film transistor 210. The insulation film 220 may be formed of $SiO_2$. The insulation film 220 may be etched to form a second contact hole 222. The second contact hole 222 may expose a portion of the thin film transistor 210. The second contact hole 222 may be filled with a conductive material to form a second contact plug 224.

Accordingly, a thin film transistor part TFTR may be formed.

Figure 3C:
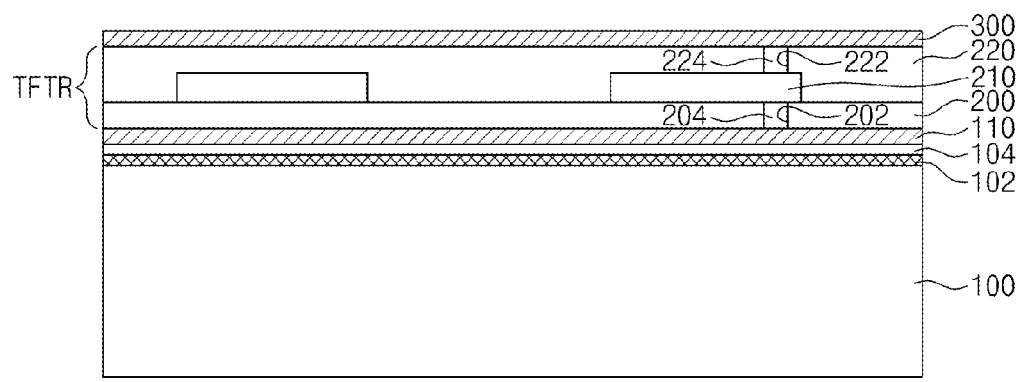

Referring to FIG. 3C, a second anode electrode 300 may be formed on the insulation film 220. The second anode electrode 300 may be a transparent electrode and include ITO, IZO, ZnO, or $In_2O_3$.

Figure 3D:
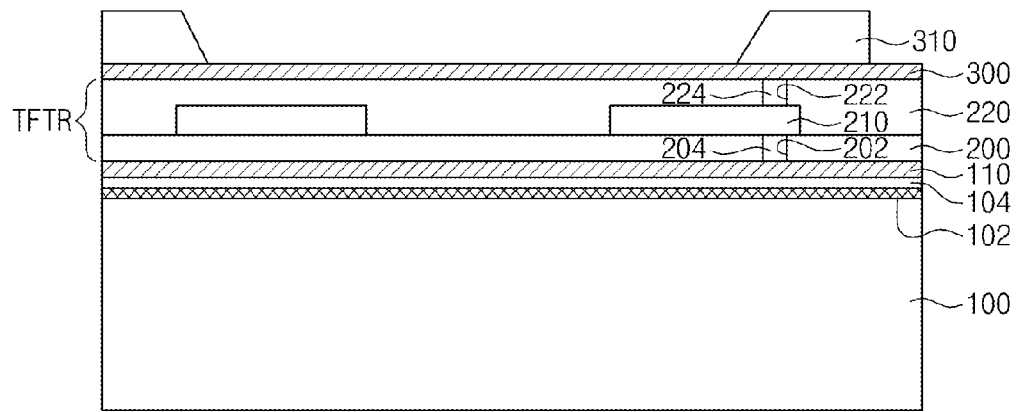

Referring to FIG. 3D, a bank 310 may be formed on the second anode electrode 300. The bank 310 may include an organic matter. According to an aspect, the bank 310 may include a photoresist material.

According to an embodiment, the bank 310 may be disposed adjacent to a non-display region NDA.

Figure 3E:
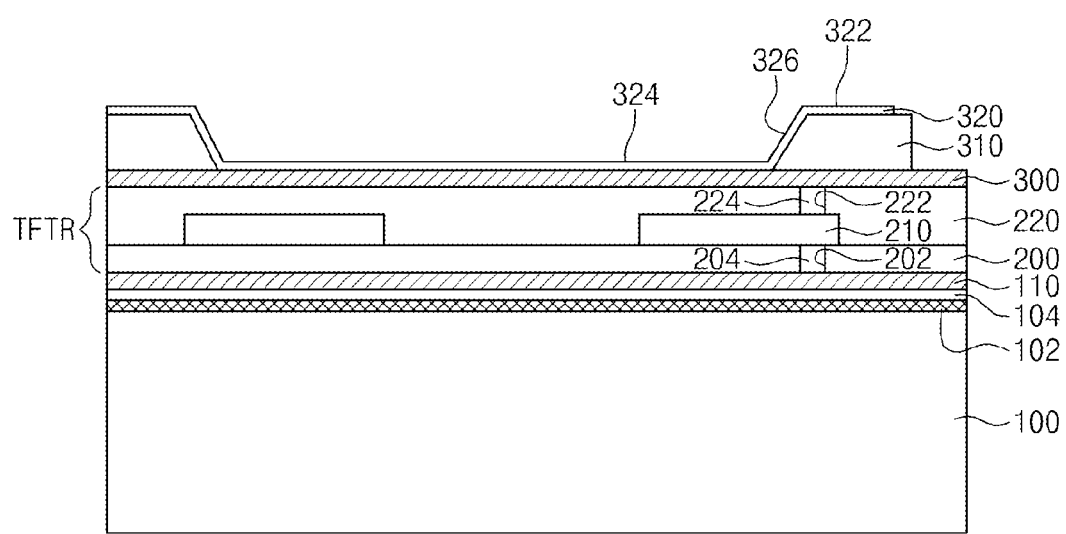

Referring to FIG. 3E, a light emission film 320 may be conformally formed on the bank 310 and the second anode electrode 300. The light emission film 320 may include an organic light emitting diode (OLED).

According to an aspect of the present invention, the light emission film 320 may include a first upper portion 322, a second upper portion 324 that is lower than the first top 322, and a side portion 326 connecting the first upper portion to the second upper portion by using the bank 310.

Figure 3F:
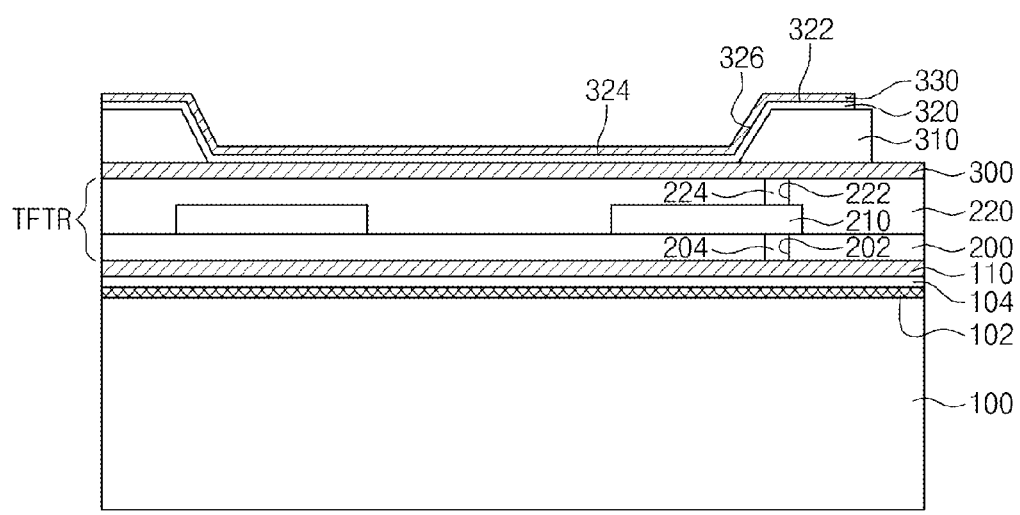

Referring to FIG. 3F, a cathode electrode 330 may be formed on the light emission film 320.

According to an aspect, the second cathode electrode 330 may include a metal having a reflective characteristic. The second cathode electrode may be formed of one of Ag, Mg, Al, Pt, Pd, Au, Ni, Nd, Ir, Cr, Li, Ca, LiF/Ca, LiF/Al, and compounds thereof. In this case, the second cathode electrode 330 may have a dual structure of a reflective film formed of the metal and electrode film formed of one of ITO, IZO, ZnO, and $In_2O_3$.

According to another aspect, the second cathode electrode 330 may be a transparent electrode and include one of ITO, IZO, ZnO and $In_2O_3$. In this case, a light absorption part 350 (see FIG. 2A) for absorbing light that is transmitted through the second cathode electrode 330 may be formed on the second substrate 340.

Figure 3G:
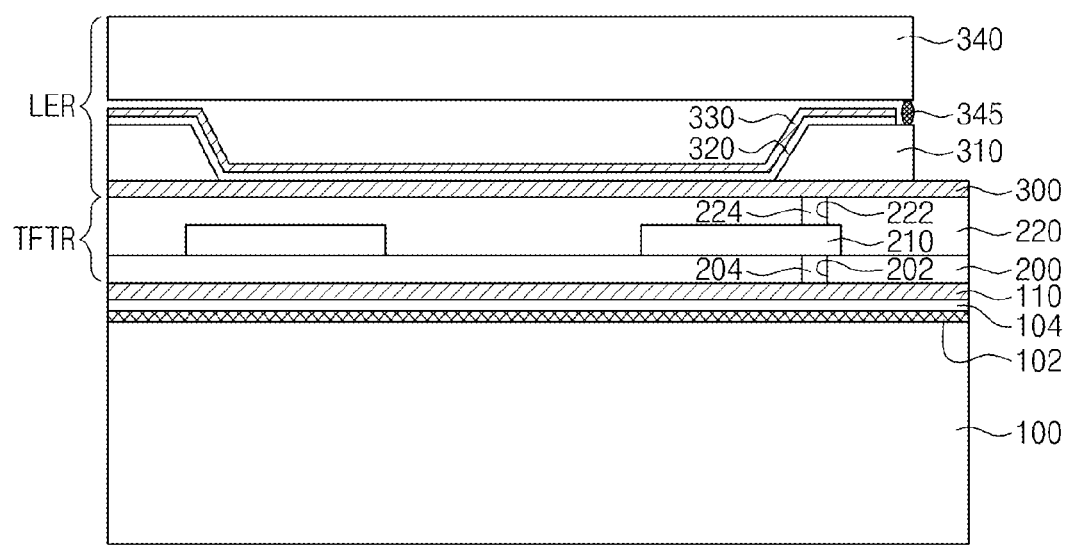

Referring to FIG. 3G, a second substrate 340 may be fixed to the second cathode electrode 330 so that the second substrate 340 is not in contact with the second cathode electrode 330.

According to an embodiment of the present invention, the second substrate 340 may be fixed to the bank 310 through an adhesion part 345 adhering to a portion of the bank 310. For example, the second substrate 340 may include a flat glass substrate having flat top and bottom surfaces. According to an aspect, the adhesion part 345 may have a thickness of about 10 μm or less.

According to another embodiment of the present invention, a can type glass encapsulation (not shown) may be used instead of the second substrate 340. In this case, a filler filled in the can type glass encapsulation is important in uniformity.

According to the above-described method, the light emitting display part LER including the second anode electrode 300, the light emission film 320, the second cathode electrode 330, the bank 310, and the second substrate 340 may be completed.

Figure 3H:
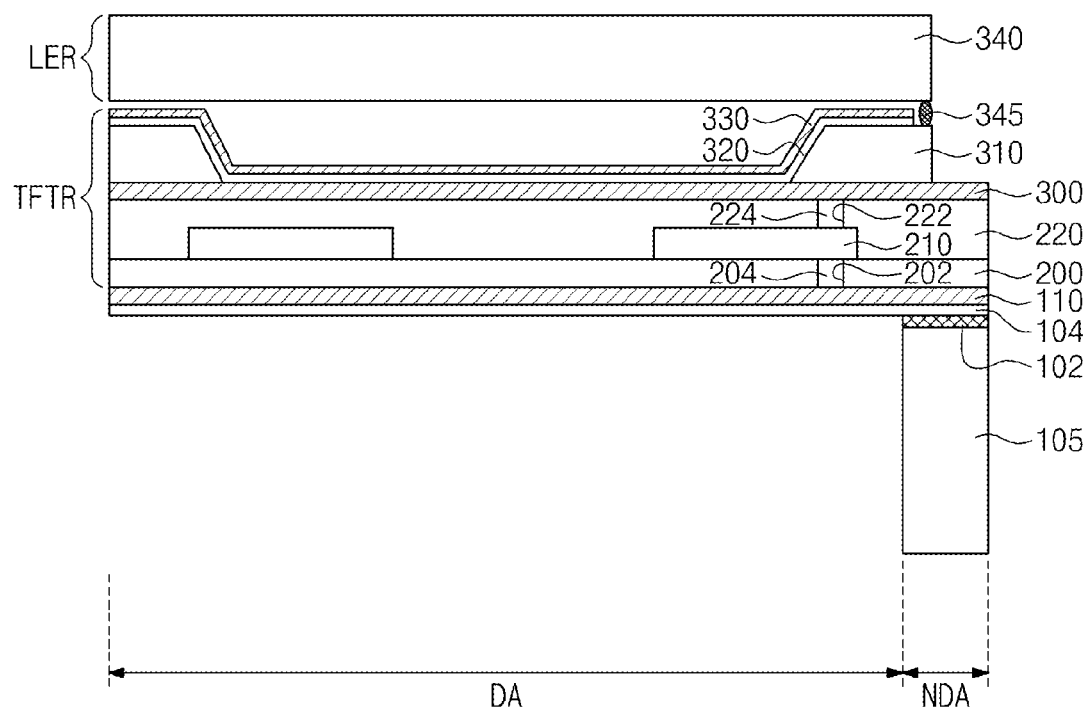

Referring to FIG. 3H, a portion of the initial substrate 100 may be etched to form the non-display region substrate 105 to define a display region DA. A portion through which the initial substrate 100 is etched to expose the second polyimide layer 104 may be the display region DA.

In more detail, the initial substrate 100 may have a thickness of about 500 μm as described above. Also, the initial substrate 100 may be etched to a thickness of about 100 μm by using a hydrofluoric acid (HF) as an etching solution.

Then, the initial substrate 100 corresponding to the display region DA may be selectively etched. The etching may be performed until a chrome layer 102 is exposed. The initial substrate 100 may remain in the non-display region NDA to endure a pressure applied when a driving part 400 is connected in the following process. The residual initial substrate 100 may be the non-display region substrate 105. According to an aspect, the chrome layer 102 may be resistant to HF and thus be used as an etch stop layer.

If a HF-resistant material is included in the second polyimide layer 104, the chrome layer 102 may be omitted.

The chrome layer 102 corresponding to the display region DA may be selectively etched. The second polyimide layer 104 corresponding to the display region DA may be exposed through the etching process.

According to another aspect, instead of the chrome layer, a multi-layers structure including a molybdenum layer/an amorphous silicon layer/a molybdenum layer may be further disposed between the non-display region substrate 105 and the second polyimide layer 104. The multi-layers structure may have a thickness of about 600 nm. For example, the molybdenum layer, the amorphous silicon layer and the molybdenum layer each may have a thickness of about 200 nm. The molybdenum layer/an amorphous silicon layer/a molybdenum layer may be more resistant to HF than the chrome layer (102).

Figure 3I:
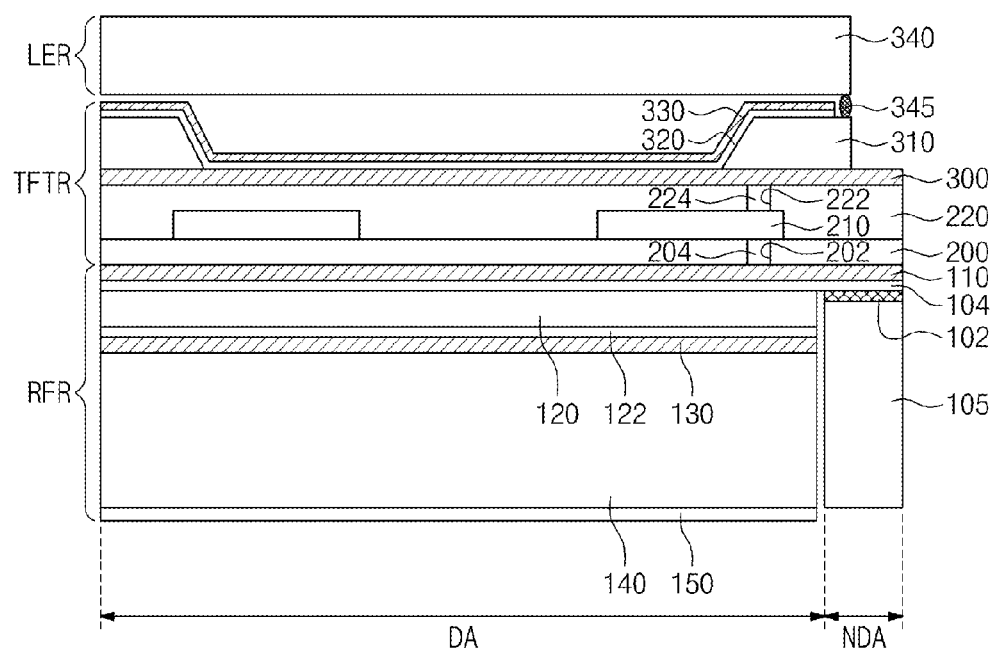

Referring to FIG. 3I, a crystal layer 120, a first polyimide layer 122, the second cathode electrode 330, and the display region substrate 140 may be successively stacked under the exposed second polyimide layer 104.

A general liquid crystal used in the LCD device may be used in the liquid crystal layer 120.

The second cathode electrode 330 may be a transparent electrode and include one of ITO, IZO, ZnO and $In_2O_3$. Also, the display region substrate 140 may include transparent plastic.

According to an embodiment of the present invention, to improve reflective characteristics of the liquid crystal layer 120, a circular polarization plate 150 may be further attached to a bottom surface of the display region substrate 140.

According to another embodiment, when the liquid crystal layer 120 has cholesteric liquid crystals, the circular polarization plate 150 may be omitted (see FIG. 2A).

Figure 3J:
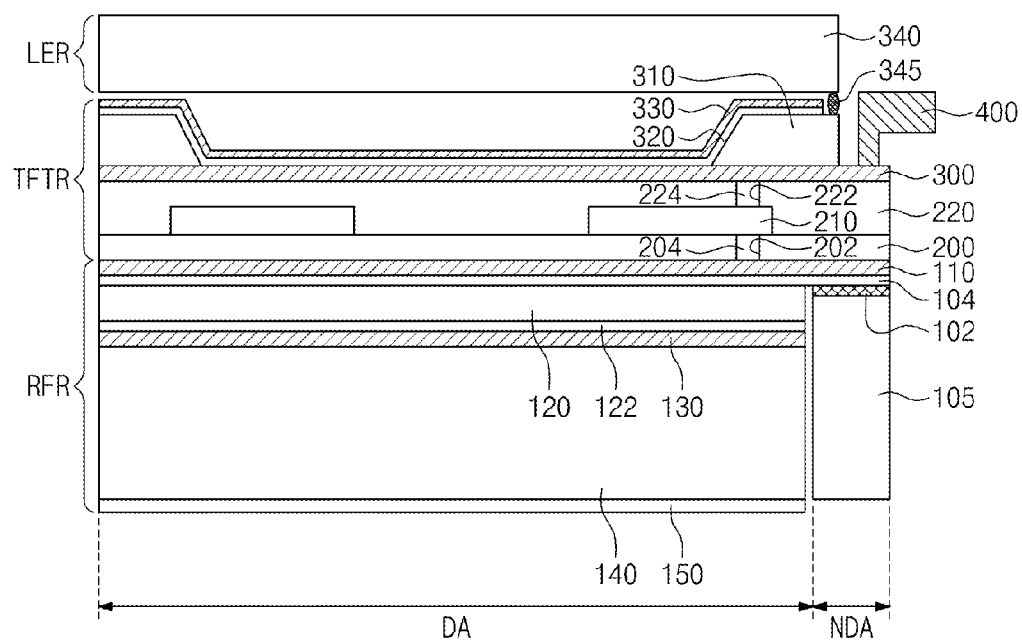

Referring to FIG. 3J, the driving part 400 may be electrically connected to the second anode electrode 300.

According to an aspect, the driving part 400 may adhere to the second anode electrode 300 by applying a pressure to a portion of the second anode electrode 300, which corresponds to the non-display region NDA on which the non-display region substrate 105 is disposed. For example, the driving part 400 may include a flexible printed circuit (FPC).

According to the embodiment of the concepts of the present invention, the display device including both light emitting display part LER and reflective display part RFR may have low power consumption when compared to existing display devices. Also, one thin film transistor may be electrically connected to the light emitting display part LER and the reflective display part RFR and then be driven to manufacture a thinner display device.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A display device comprising:
a reflective display part including a first cathode electrode and a first anode electrode that face each other and a liquid crystal layer that is filled between the first cathode electrode and the first anode electrode;
a light emitting display part spaced apart from the reflective display part, the light emitting display part including a second cathode electrode and a second anode electrode that face each other and a light emission film between the second cathode electrode and the second anode electrode; and
a thin film transistor part between the reflective display part and the light emission display part, the thin film transistor being electrically connected to the first and second anode electrodes,
wherein the light emitting display part further includes a bank disposed on one side of the second anode electrode between the second anode electrode and the light emission film.

2. The display device of claim 1, wherein the light emission film includes a first upper portion that is in contact with the bank, a second upper portion below the first upper portion to contact the second anode electrode, and a side portion connecting the first and second upper portions to each other.

3. The display device of claim 1, wherein the reflective display part further includes a first substrate below the first anode electrode, and
the first substrate includes a display region substrate corresponding to a display region and a non-display region substrate corresponding to the non-display region.

4. The display device of claim 3, further comprising a driving part electrically connected to the light emitting display part and disposed on a position corresponding to the non-display region.

5. The display device of claim 3, further comprising a circular polarization plate adjacent to the non-display region.

6. The display device of claim 1, further comprising a second substrate spaced apart from the second cathode electrode to face the second cathode electrode,
wherein the second substrate is coupled to the bank by using an adhesion part.

7. The display device of claim 6, wherein the adhesion part has a thickness of about 10 μm or less.

8. The display device of claim 1, wherein the first cathode electrode and the first and second anode electrodes are transparent electrodes, and
the second cathode electrode is a reflective electrode.

9. The display device of claim 1, wherein the liquid crystal layer comprises a cholesteric liquid crystal,
the first and second cathode electrodes and the first and second anode electrodes are transparent electrodes, and
the display device further comprises a light absorption layer disposed adjacent to the second substrate to absorb light.

10. A method for manufacturing a display device, the method comprising:
forming a reflective display part including a first substrate, a first anode electrode, a first cathode electrode, and a liquid crystal layer, which is filled between the first anode electrode and the first cathode electrode on the first substrate;
forming a light emitting display part spaced apart from the reflective display part, the light emitting display part including a second anode electrode, a light emission film, a bank, and a second cathode electrode; and
forming a thin film transistor part between the reflective display part and the light emitting display part to be electrically connected to the first and second anode electrodes,
wherein the forming of the light emitting display part includes:
forming a bank on one side of the second anode electrode;
conformally forming the light emission film on the bank and the second anode electrode;
conformally forming the second cathode electrode on the light emission film.

11. The method of claim 10, wherein the forming of the reflective display part further comprises:
forming the first anode electrode on an initial substrate;
etching the initial substrate to form a non-display region to define a display region and the non-display region; and
forming the liquid crystal layer, the first cathode electrode, and a display region substrate on the first anode electrode exposed to display region.

12. The method of claim 11, wherein the forming of the reflective display part further comprises:
forming a first polyimide layer between the initial substrate and the first anode electrode; and
forming a second polyimide layer between the liquid crystal layer and the first cathode electrode.

13. The method of claim 12, wherein the forming of the reflective display part further comprises forming a chrome layer between the initial substrate and the first polyimide layer,
wherein the chrome layer serves as an etch stop layer while the initial substrate is etched.

14. The method of claim 11, further comprising forming a driving part electrically connected to a portion of the second anode electrode, which corresponds to the non-display region.

15. The method of claim 11, further comprising forming a circular polarization plate that is adjacent to the display region substrate.

16. The method of claim 10, further comprising:
forming a passivation layer having a first contact hole, through which a portion of the anode electrode is exposed, on the first anode electrode;
forming a first contact plug formed by filling a conductive material into the first contact hole;
forming a thin film transistor electrically connected to the first contact plug on the passivation layer;
forming an insulation film having a second contact hole, through which a portion of the thin film transistor is exposed, on the thin film transistor; and
forming a second contact plug formed by filling the conductive material into the second contact hole,
wherein the second contact plug electrically connects the thin film transistor to the second anode electrode.

17. The method of claim 10, further comprising adhering a second substrate that is spaced apart from the second cathode electrode to the second cathode electrode by using the bank and the adhesion part,
wherein the adhesion part has a thickness of about 10 μm or less.

18. The method of claim 17, wherein, when the liquid crystal layer is formed by using a cholesteric liquid crystal, the second cathode electrode is a transparent electrode, and
the method further comprises forming a light absorption layer disposed adjacent to the second substrate to absorb light.

* * * * *